(12) United States Patent
Locaputo

(10) Patent No.: US 6,901,680 B2
(45) Date of Patent: Jun. 7, 2005

(54) SYSTEM FOR SPACING FLUTES ON A WORKPIECE

(76) Inventor: Daniel R. Locaputo, 2805 Country Lake Dr., Cincinnati, OH (US) 45233

( * ) Notice: Subject to any disclaimer, the term of this patent is extended or adjusted under 35 U.S.C. 154(b) by 0 days.

(21) Appl. No.: 10/400,019

(22) Filed: Mar. 26, 2003

(65) Prior Publication Data

US 2004/0187335 A1 Sep. 30, 2004

(51) Int. Cl.[7] .............................................. G01D 21/00
(52) U.S. Cl. ........................... 33/642; 33/628; 33/638; 33/562; 33/429; 144/144.1; 269/303
(58) Field of Search ........................... 33/42, 201, 613, 33/628, 638–639, 642, 645, 562, 568, 573, 429; 144/144.1, 144.51, 144.52, 145.1, 145.2; 269/99, 303–304

(56) References Cited

U.S. PATENT DOCUMENTS

| | | | | |
|---|---|---|---|---|
| 2,916,063 A | * | 12/1959 | Boekenkamp | 144/136.1 |
| 3,734,151 A | * | 5/1973 | Skripsky | 144/286.5 |
| 3,747,389 A | * | 7/1973 | Harvey | 72/375 |
| 4,108,566 A | * | 8/1978 | Jones | 408/115 R |
| 4,235,022 A | * | 11/1980 | Fernandez Aldape | 33/474 |
| 4,294,297 A | * | 10/1981 | Kieffer | 144/154.5 |
| 4,323,100 A | * | 4/1982 | Silken | 144/154.5 |
| 4,382,590 A | * | 5/1983 | Pandya et al. | 269/87.2 |
| 4,685,496 A | * | 8/1987 | Livick | 144/154.5 |
| 4,752,162 A | * | 6/1988 | Groh | 408/115 R |
| D345,511 S | * | 3/1994 | Petrohilos | D10/64 |
| 5,423,360 A | | 6/1995 | Taylor et al. | |
| 5,452,751 A | * | 9/1995 | Engler et al. | 144/253.6 |
| 5,533,556 A | | 7/1996 | Whitney | |
| 5,560,408 A | * | 10/1996 | DiFranco | 144/144.1 |
| 5,598,878 A | * | 2/1997 | Wirth et al. | 144/144.51 |
| 5,671,538 A | * | 9/1997 | Lautenschlager | 33/194 |
| 5,768,966 A | * | 6/1998 | Duginske | 83/468.7 |
| 5,816,300 A | | 10/1998 | Rogers | |
| 5,890,524 A | | 4/1999 | Tucker et al. | |
| 5,967,717 A | | 10/1999 | Tucker et al. | |
| 5,983,767 A | * | 11/1999 | DeFelice et al. | 83/745 |
| 6,145,556 A | | 11/2000 | Wood | |
| 6,164,176 A | | 12/2000 | Larsson | |
| 6,206,060 B1 | | 3/2001 | Blake | |
| 6,305,449 B1 | | 10/2001 | Stover | |
| 6,481,477 B1 | | 11/2002 | Szymanski et al. | |
| 6,499,224 B1 | * | 12/2002 | Asick | 33/628 |
| 6,524,033 B1 | * | 2/2003 | Sykes | 408/1 R |
| 6,585,018 B2 | * | 7/2003 | Butaud | 144/371 |

OTHER PUBLICATIONS

Etter, *Router Edge Guide*, Des. 410,394.

* cited by examiner

*Primary Examiner*—Christopher W. Fulton
*Assistant Examiner*—Tania Courson
(74) *Attorney, Agent, or Firm*—Wood, Herron & Evans

(57) ABSTRACT

A system, apparatus, and method for spacing and aligning flutes to be routed in a workpiece is disclosed. The system includes a flute-spacing jig with spaced alignment holes, a workpiece aligner, and a fence guide. Additionally, the system can include a T-square with adjustable stop-blocks.

67 Claims, 8 Drawing Sheets

SYSTEM FOR SPACING FLUTES ON A WORKPIECE

FIELD OF THE INVENTION

The present invention relates to woodworking tools in general and, more particularly, to woodworking involving the routing of flutes in a workpiece.

BACKGROUND OF THE INVENTION

The cutting, or routing, of flutes in a workpiece, such as a board, has been done for many years. Typically in a woodworking context, flutes are routed in a board using a router table, which is well known in the industry. A typical router table has a router attached to the underside of the table whereby a router bit protrudes upward through an opening in the table surface. Boards or other workpieces are then moved across the router table and over the rotating router bit, whereby a flute is cut or routed in the board.

A typical router table also has a router fence attached to it, which can be used to guide a workpiece as it is being slid across the router table. Typically, the router fence is slidably adjusted on the router table to accommodate different width workpieces or to facilitate the alignment of the flute on the workpiece. If multiple flutes are desired on a workpiece, the router fence is moved relative to the router bit to permit the workpiece to be guided along a different line relative to the router bit to create another flute on the workpiece.

While the routing of a flute in a workpiece can be a fairly straightforward process, the measuring and aligning of the workpiece to create equally-spaced multiple flutes can be a very time-consuming and tedious process. Before a flute in a workpiece is routed, the router fence must be adjusted relative to the router bit so that it will route a flute along a desired line on the workpiece. If more than one flute is desired, the measuring and alignment process must be repeated, and if equally spaced flutes are desired, additional care must be taken to ensure the necessary alignment is properly set.

The preparation of a workpiece to be routed is further complicated when stop-flutes are desired to be routed in the workpiece. In other words, when a craftsman desires to have a flute stop at some point short of the end of the workpiece, another measurement and mark typically must be made, and extreme care must be taken when the workpiece is slid over the router bit to ensure that only the desired length of the flute is actually routed. In some cases, errors in measurement, or errors in alignment and routing, can cause the entire workpiece to become unusable for the desired application, and it must be discarded.

Accordingly, there is a need to minimize the setup time required to route one flute, or more than one equally-spaced and aligned flutes in a workpiece. There is also a need to minimize the setup time required to route one or more equally-spaced and positioned stop-flutes in a workpiece.

OBJECTS OF THE INVENTION

It is an object of the invention to minimize the setup time required to route one flute in a workpiece. It is another object of the invention to minimize the setup time required to route more than one equally-spaced and positioned flutes in a workpiece. It is another object of the invention to minimize the setup time required to route one stop-flute in a workpiece. It is another object of the invention to minimize the set up time required to route more than one equally-spaced and positioned stop-flutes in a workpiece. It is another object of the invention to create more than one flute without changing the fence relative to the router bit. It is another object of the invention to adjust the fence relative to the router bit and route two flutes in a workpiece without readjusting the fence.

SUMMARY OF THE INVENTION

The present invention provides a system, apparatus, and method for achieving these objects. More particularly, the system of the present invention utilizes a router table with an attached router and router bit, a router fence slidably attached to the router table, and a flute-spacing jig. The flute-spacing jig apparatus of the present invention includes a plurality of spaced alignment holes, a fence guide, and a workpiece aligner whereby a workpiece may be desirably positioned for routing spaced flutes. The present invention also provides for a T-square slidably attached to the router table, which has adjustable, removable or hinged stop-blocks attached to it, thereby facilitating the routing of evenly-spaced stop-flutes in a workpiece.

The above and other objects and advantages of the present invention shall be made apparent from the accompanying drawings and the brief description thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION OF THE INVENTION

Figure 1:
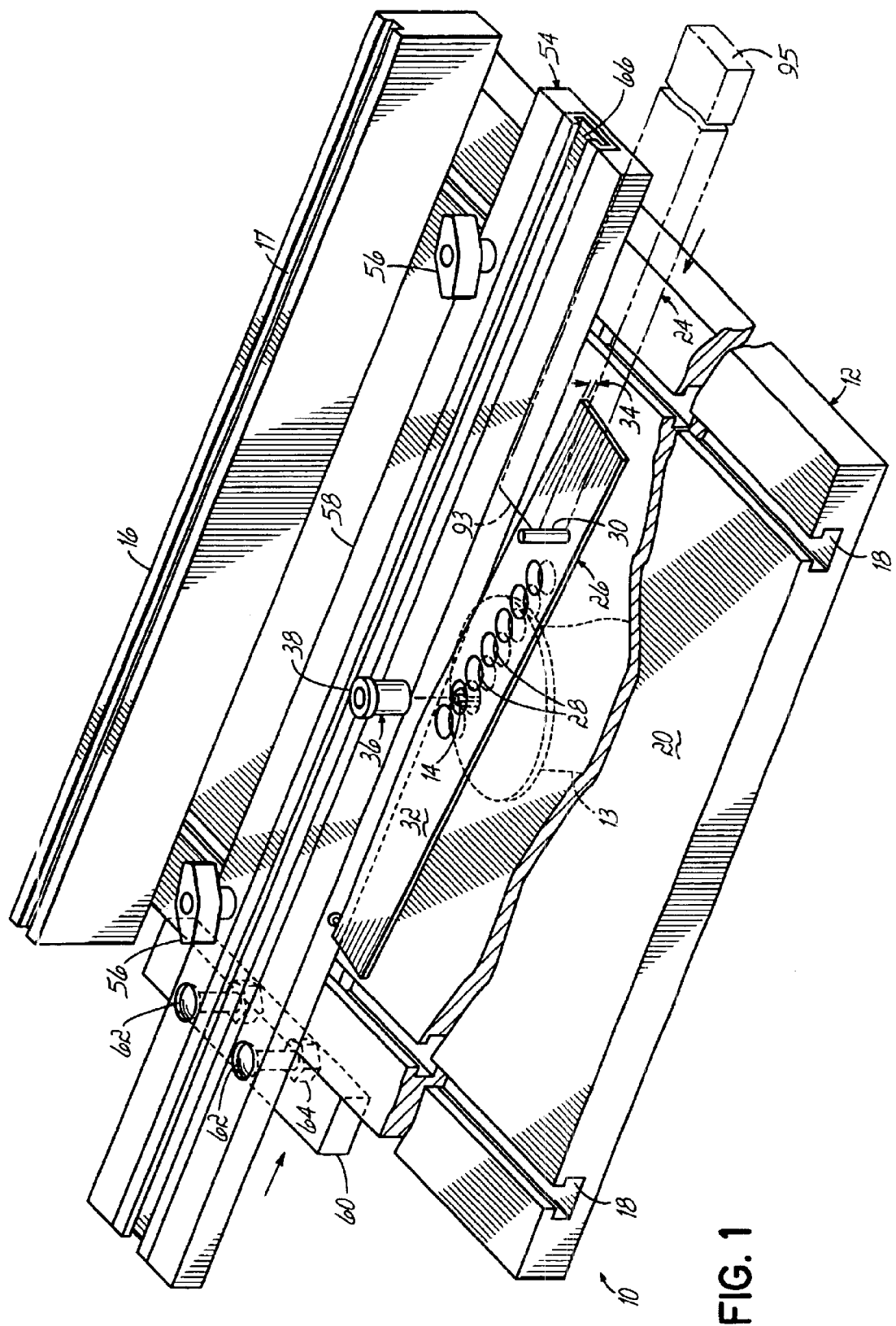
FIG. 1 is a perspective view of an embodiment of a system for spacing flutes according to the present invention.

Referring to the figures and to FIG. 1 in particular, the system 10 of the present invention for spacing flutes in a workpiece is comprised of a router table 12, which has attached to it a router 13 and a router bit 14. Additionally, the router table 12 has a router fence 16, which is slidably attached to the router table 12 via channels or tracks 18. The router fence 16 can thus be moved toward and away from the router bit 14, as desired. A longitudinal channel 17 is also positioned in the router fence 16. The router bit 14 typically extends above the top surface 20 of the router table 12 at a distance corresponding to the desired depth of the muted flute 22 in a workpiece 24. As shown, the system 10 also comprises a flute-spacing jig 26, which has a plurality of generally spaced alignment holes 28. Another embodiment of the flute-spacing jig 26 could have only one alignment hole 28. Such a flute-spacing jig 26 could be used to route one or two flutes 22 in a workpiece 24. The flute-spacing jig 26 can be made out of wood, metal (e.g., aluminum), plastic, fiber glass or the like. In one embodiment of the present invention, the flute-spacing jig 26 is made out of 0.64 cm (0.25") aluminum stock. The flute-spacing jig 26 also contains a workpiece aligner 30. As shown in this embodiment, the workpiece aligner 30 is raised and is in the form of a pin.

While the spaced alignment holes 28 in the flute-spacing jig 26 shown in FIG. 1 create apertures in the flute-spacing jig 26, in alternative embodiments, the top surface 32 of the flute-spacing jig 26 could be solid. In such an embodiment, the wood-spacing jig 26 would be of a thickness 34 so as to allow it to remain in planar contact with the top surface 20 of the router table 12 when it is placed over the router bit 14.

Figure 2A:
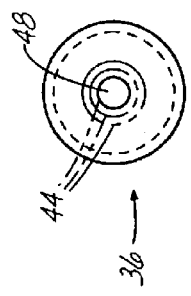
FIG. 2A is a top view of a bushing of the present invention shown in FIG. 1.
Figure 2B:
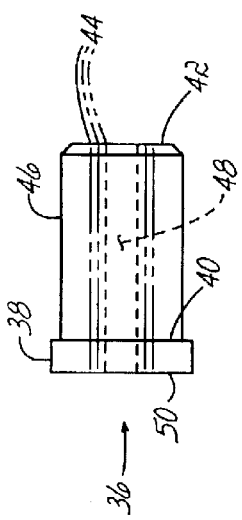
FIG. 2B is a side view of the bushing shown in FIGS. 1 and 2A.

In the embodiment of the present invention shown in FIG. 1, a bushing 36 is placed through the spaced alignment hole 28 and over the router bit 14 to properly align the spaced alignment hole 28 over the router bit 14. As shown in FIGS. 2A and 2B, the bushing 36 of the embodiment of the present invention shown in FIG. 1 has a flange 38 with a bottom surface 40 that rests on the top surface 32 of the flute-spacing jig 26. In alternative embodiments, the bottom surface 42 of the bushing 36 could rest on the top of the collet (not shown) of the router. In such an embodiment, the bushing 36 would not have to have a flange 38.

In order to accommodate different size router bits 14, the aperture 44 running longitudinally through the body 46 of the bushing 36 can have a variety of internal diameters. For example, to accommodate a router bit 14 with a diameter of 0.64 cm (0.25"), the diameter of the aperture 44 and lumen 48 of the bushing 36 may have an internal diameter of approximately 0.648 cm (0.255"). Similarly, a bushing 36 designed to fit over a router bit 14 with a diameter of 0.953 cm (0.375") would have an aperture 44 and lumen 48 diameter of approximately 0.965 cm (0.380"), and a bushing 36 configured to slide over a router bit 14 with a diameter of 1.27 cm (0.5") would have an aperture 44 and lumen 48 diameter of approximately 1.28 cm (0.505").

While the embodiment of the bushing 36 shown in FIGS. 1, 2A and 2B show a lumen 48 extending from the bottom surface 42 of the bushing 36 through the top surface 50 of the bushing, in alternative embodiments, the top surface 50 of the flange 38 could be solid, with the lumen 48 only extending partially into the bushing 36 from the bottom surface 42. Likewise, in embodiments where the bushing 36 does not include a flange 38, the top surface of the bushing 36 could also be solid, whereby the lumen 48 would extend from the bottom surface 42 only partially into the bushing 36.

The exterior diameter of the body 46 of the bushing 36 is sized to be able to be slip-fitted into the spaced alignment holes 28. For example, if the, diameter of the spaced alignment holes is 1.9 cm (0.75"), the exterior diameter of the body 46 of the bushing 36 will be approximately 1.89 cm (0.746").

In an embodiment of the present invention utilizing a bushing 36 with a flange 38 and spaced alignment holes 28 with a diameter of 1.9 cm (0.75") in the flute-spacing jig 26, the top surface 50 of the flange 38 will typically have a diameter of 2.22 cm (0.875"). Moreover, a typical bushing 36 will have a total height of 3.49 cm (1.375"), with a height from the bottom surface 42 of the bushing 36 to the bottom surface 40 of the flange 38 of 2.86 cm (1.125"). However, it should be appreciated that the dimensions of the bushing 36 may vary, depending on the size of the spaced alignment holes 28, the length of the router bit 14, and the distance from the top surface 32 of the flute-spacing jig 26 to the top of the router collet (not shown).

In an alternative embodiment, the spaced alignment holes 28 could be sized to desirably fit over a router bit 14 without the use of a removable bushing 36. In other words, different flute-spacing jigs 26 could have spaced alignment holes 28 with diameters to correspond to the sizes of various router bits 14. For example, to accommodate a router bit 14 with a diameter of 0.64 cm (0.25"), the flute-spacing jig 26 would have spaced alignment holes 28 with a diameter of approximately 0.648 cm (0.255"). A flute-spacing jig 26 adapted to be used with a router bit 14 with a diameter of 0.953 cm (0.375") would have spaced alignment holes 28 with a diameter of approximately 0.965 cm (0.380"), and a flute-spacing jig 26 adapted to be used with a router bit 14 with a diameter of 1.27 cm (0.5") would have spaced alignment holes 28 with a diameter of approximately 1.28 cm (0.505").

In another alternative embodiment, the spaced alignment holes 28 could be configured or shaped so as to accommodate router bit 14 of various diameters. For example, the spaced alignment holes 28 could be conically shaped whereby the router bit 14 would still be centered in the alignment hole 28 when the flute-spacing jig 26 is placed over the router bit 14. Other centering mechanisms known in the art could also be used with an alternative embodiment of the flute-spacing jig 26 to center the router bit 14 in the alignment hole 28 when the flute-spacing jig 26 is placed over the router bit 14.

The workpiece aligner 30, in the embodiment of the present invention illustrated in FIG. 1, is a pin with a diameter of 0.64 cm (0.25") and a height of 3.18 cm (1.25"). However, it can be appreciated that the raised aligner 30 could have a variety of widths and/or heights. Typically, there will be an aperture in the top surface 32 of the flute-spacing jig 26 at the location where the aligner 30 is to be placed. In the embodiment of the present invention illustrated in FIG. 1, there is a 0.64 cm (0.25") hole in the top surface 32 of the flute-spacing jig 26 at the position where the aligner 30 is to be placed. As shown, the raised pin 30 is then press-fitted into the 0.64 cm (0.25") hole in the top surface 32 of the flute-spacing jig 26.

The embodiment of the flute-spacing jig 26 shown in FIG. 1 has a tapered end portion 52. The tapered end portion 52 of the flute-spacing jig 26 can allow the flute-spacing jig 26 to be properly aligned over the routing bit 14 when the workpiece 24 is positioned between the fence 16 and the raised aligner 30. However, it can be appreciated by those skilled in the art that other configurations of the tapered end portion 52 could be utilized to avoid contacting the fence 16 at an undesirable point. For example, the end portion 52 could be completely cut away with only a brace or a rod extending the desirable distance to support the proper contact point with the fence 16.

As shown in FIG. 1, one embodiment of the system 10 for spacing flutes 22 in a workpiece 24 includes a T-square 54 slidably attached to the router table 12. The use of a T-square 54 allows the advantageous routing of stop flutes 22. The T-square is attached to the router table 12 via the tracks 18 in the top surface 20 of the table 12. The T-square 54 can be attached to the channels 18 and the router table 12 via standard knobs 56, bolts, nuts and washers.

The T-square 54 has two main longitudinal sections 58, 60 which are perpendicularly attached to each other via standard bolts 62, washers, and nuts 64. In one embodiment of the present invention, carriage bolts 62 with either hex- or wing-nuts 64 are used to attach the two sections 58, 60 of the T-square 54 together.

In one embodiment of the router table T-square 54 of the present invention, the longitudinal portion 58 of the T-square 54 that is parallel with the fence 16 is approximately 122 cm (48") long and has a thickness of about 2.5 cm (1"). This longitudinal portion 58 can be used to guide the workpiece 24 and, in this regard, functions much like the fence 16. The portion of the T-square 60 that is perpendicular to the router table fence 16, in one embodiment of the present invention, is approximately 36 cm (14") long and has a thickness of about 1.9 cm (0.75"). Both portions 58, 60 typically have widths of between 5 cm (2") and 7.6 cm (3") inches, however, it should be appreciated that other dimensions and sizes could equally be used without detracting from the inventive concept of the present invention.

The longitudinal portion 58 of the T-square 54 that is parallel with the router table fence 16 has a longitudinally running channel or slot 66 generally offset on the leg 58 of the T-square 54. In one embodiment of the present invention, the channel, or slot 66, is positioned 3.18 cm (1.25") from the edge of the leg 58 that is operationally closest to the router bit 14 and is a T-track and can be used to attach stop-blocks 68 to the T-square 54.

Figure 3:
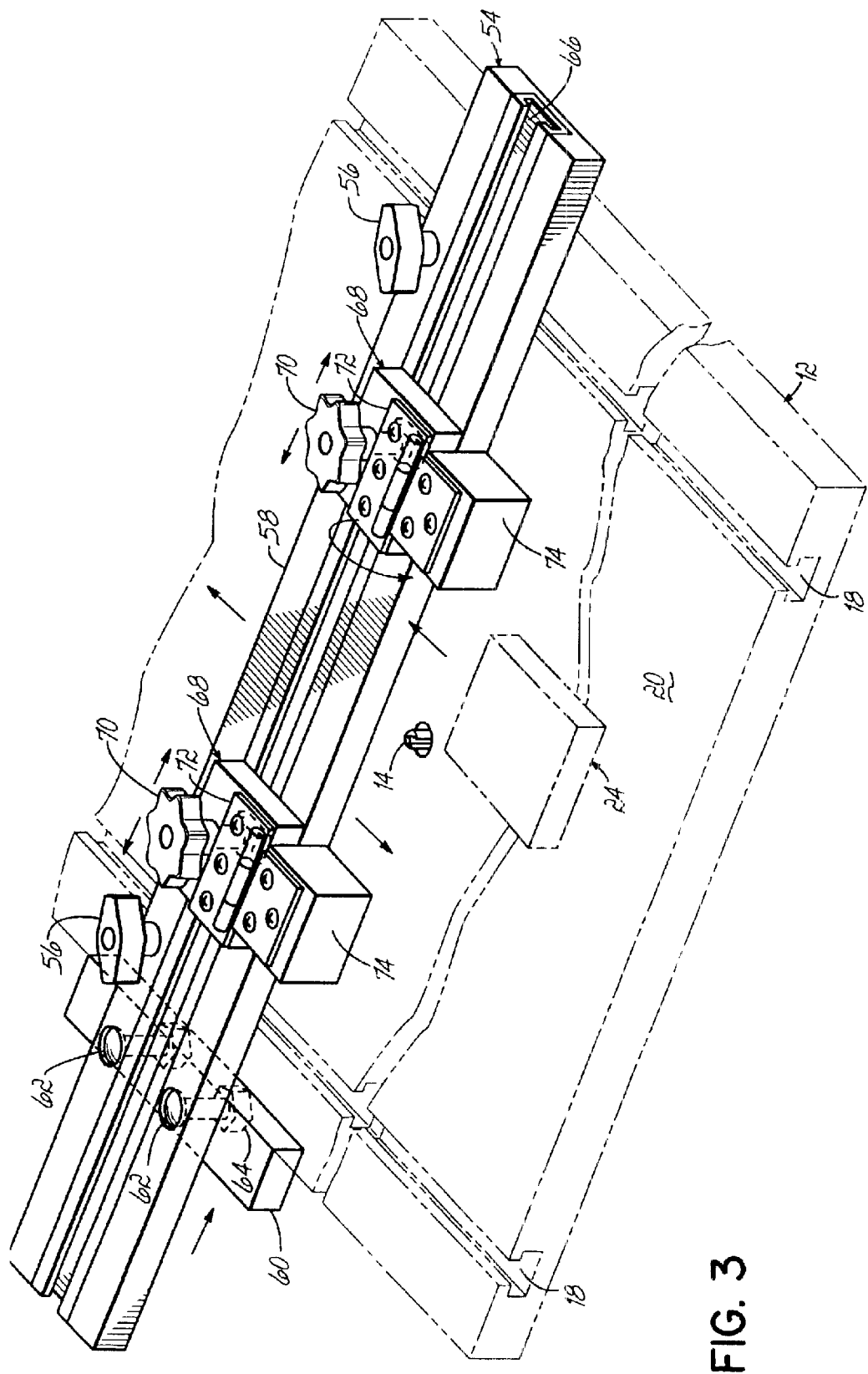
FIG. 3 is a perspective view of an alternative embodiment of the T-square shown in FIG. 1 according to the present invention.

FIG. 3 illustrates another embodiment of the T-square of the present invention. Here, the stop-blocks 68 are attached to the longitudinal channel 66 of the T-square 54 via standard knobs 70 and bolts. It should be appreciated by those skilled in the art that the T-square 54 with the stop-block 68 can be utilized whenever a stop-flute is desired to be cut. In other words, the block 74 is used to prevent the workpiece 24 from moving beyond the desired distance. Thus, all flutes 22 in a workpiece 24 will start and end evenly.

The knob 70 can be adjusted to allow the stop-block 68 to slide along the channel 66 of the T-square 54. In this embodiment of the present invention, the stop-block 68 contains a hinge 72 which allows a portion of the stop-block to be raised out of the way of the path of a workpiece 24 as it is fed along a path parallel to the long leg 58 of the T-square and over the router bit 14. The portion of the stop-block 74 that can be raised allows for the same T-square to be used to route full flutes, stop-flutes, or a combination in the same workpiece. It also allows for handling workpieces 24 that are of a length greater than the long leg 58 of the T-square. Finally, the stop-block 68 may also be removed from the T-square 54 for applications where it is not needed or desired.

Figure 4:
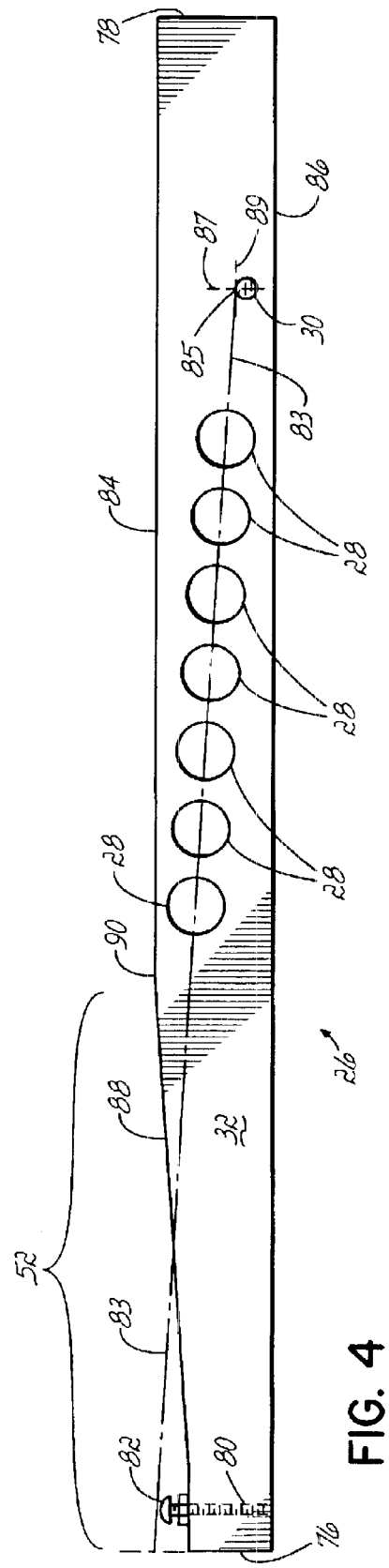
FIG. 4 is a top view of the embodiment of a flute-spacing jig of the present invention shown in FIG. 1.

FIG. 4 shows a top view of the flute-spacing jig 26 of the present invention illustrated in FIG. 1. In this embodiment of the present invention, the flute-spacing jig 26 has a first end 76 with a width of 2.86 cm (1.125") and a second end 78 with a width of 3.8 cm (1.5"). In this embodiment, the flute-spacing jig 26 has a length of 50.8 cm (20"). The flute-spacing jig 26 also has a tapped hole 80 which is positioned one-half of one inch from the first end 76 of the flute-spacing jig 26. This tapped hole 80, which in one embodiment is a #6-32 tap, is configured to receive the fence guide 82. As shown in this embodiment of the present invention, the fence guide 82 comprises a screw and a locking nut.

As further shown in this embodiment of the present invention, the center of the workpiece aligner 30 is positioned at a point along an imaginary line parallel to the first end 76 of the flute-spacing jig 26 and located a distance of 40.561 cm (15.969") from the center of the #6-32 tapped hole 80, or approximately 41.831 cm (16.469") from the first end 76. Additionally, the point on that imaginary line is located so that the outside surface of the workpiece aligner 30 that is closest to the first side 84 of the flute-spacing jig 26 will be 2.5 cm (1") from the first side 84.

The plurality of spaced alignment holes 28 are centered on an imaginary angular line 83 that runs from the point 85 on the outside surface of the workpiece aligner 30 that is closest to the first side 84 of the flute-spacing jig 26 to a point created by the intersection of a first imaginary line parallel to the first end 76 and centered on the tapped hole 80, i.e., this first imaginary line is 1.27 cm (0.5") from the first end 76 of the flute-spacing jig 26, and a second imaginary line that is parallel with the second edge 86 of the flute-spacing jig 26 and also intersects the point where the first side 84 intersects the second end 78 of the flute-spacing jig 26, i.e., this second imaginary line is 3.8 cm (1.5") from the second side 86 of the flute-spacing jig 26. In other words, in the embodiment of the present invention illustrated in FIG. 3, the imaginary angular line 83 upon which the spaced alignment holes 28 are centered runs between two points. The first point occurs at a position between the first end 76 and the second end 78 and the first side 84 and the second side 86 of the flute-spacing jig 26 and, more particularly, at a point 1.27 cm (0.5") from the first end 76 and at a point 3.8 cm (1.5") from the second side 86 of the flute-spacing jig 26. The second point of the imaginary angular line 83 occurs at a position between the first end 76 and the second end 78 and the first side 84 and the second side 86 of the flute-spacing jig 26 and, more particularly, at a point 2.5 cm (1") from the first side 84 and 41.831 cm (16.469") from the first end 76.

In the embodiment of the present invention shown in FIG. 4, each of the spaced alignment holes 28 has a diameter of 1.9 cm (0.75"). In addition to the spaced alignment holes 28 being centered on an imaginary line running between the points heretofore described, they are also each centered on respective imaginary lines running parallel to the first end 76 and the second end 78, and perpendicular to the second side 86 of the flute-spacing jig 26. The positions of these respective imaginary lines are determined by their distance from a vertical imaginary line 87 that runs parallel to the first end 76 and second end 78, and perpendicular to the second side 86 of the flute-spacing jig 26 and through the center of the position of the workpiece aligner 30, i.e., this vertical imaginary line is 40.561 cm (15.969") from the centerline of tapped hole 80. According to one embodiment of the present invention, the distances between these respective imaginary lines and the reference imaginary line are as follows: 5.07 cm (1.996"), 7.605 cm (2.994"), 10.14 cm (3.992"), 12.67 cm (4.990"), 15.21 cm (5.988"), 17.74 cm (6.986"), and 20.28 cm (7.984").

The position of the spaced alignment holes 28 of the embodiment of the present invention illustrated in FIG. 4 can also be determined by calculating the distance of the respective imaginary lines between the aforementioned imaginary angular line 83 and a horizontal imaginary line 89 located between the first side 84 and the second side 86 of the flute-spacing jig 26 and is parallel to the second side 86 of the flute-spacing jig 26. This horizontal imaginary line 89 is positioned approximately 2.5 cm (1.") from the first side 84 (1.27 cm or 0.5"from the second side 86) of the flute-spacing jig 26, and is also tangential to the edge of the workpiece aligner 30. Thus, the spaced alignment holes 28 will be centered on the imaginary angular line 83 at points where the distances of the respective imaginary lines between the imaginary angular line 83 and the horizontal imaginary line 89 are as follows: 0.318 cm (0.125"), 0.4763 cm (0.1875"), 0.64 cm (0.25"), 0.7938 cm (0.3125"), 0.952 cm (0.375"), 1.111 cm (0.4375"), and 1.27 cm (0.5").

In the embodiment of the present invention shown in FIG. 4, the first side 84 tapers toward the second side 86. The taper 88 begins at a point 90 on the first side 84 that is located 22.9 cm (9") from the vertical imaginary line which bisects the center of the position of the workpiece aligner 30, and is also parallel to the first end 76 and the second end 78, and perpendicular to the second side 86 of the flute-spacing jig 26. The taper 88, as shown in FIG. 4, ends at a point between the first end 76 and the second end 78 of the flute-spacing jig 26 and, more particularly, at a point 2.54 cm (1") from the first end 76.

FIGS. 5A, 5B, 5C, and 5D illustrate the process of setting up the jig 26 and routing three evenly-spaced flutes 24 in a workpiece 22. The standard setup for machining flutes 22 in a workpiece 24 should be followed such as setting the desired depth of cut for the router bit 14, etc. As shown, the first spaced alignment hole 92 of the flute-spacing jig 26 is positioned over the router bit 14. Also as shown, a bushing 36 is used to aid in the alignment process. Once the proper spaced alignment hole 28 is positioned over the router bit 14, the fence 16 is slid forward to facilitate the bracing of the workpiece 24 between the fence 16 and the workpiece aligner 30. Additionally, the fence guide 82 also makes contact with the fence 16. In alternative embodiments, a T-square 54 could be used to position the workpiece 24 and make contact with the fence guide 82, as opposed to the router fence 16. Once the workpiece 24 is properly orientated, the flute-spacing jig 26 is removed, along with a bushing 36, if used. Once the router 13 is turned on the first end 93 of the workpiece 24 is moved along the fence 16 and over the rotating router bit 14 whereby a center flute 22 is routed in the workpiece 24.

Figure 5A:
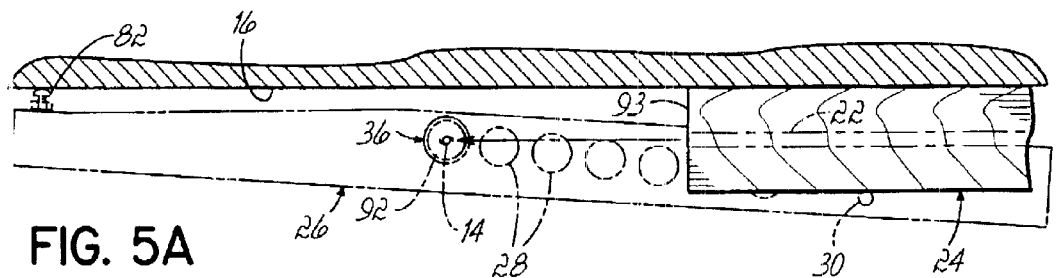
FIG. 5A is a top view of the flute-spacing jig shown in FIGS. 1 and 4 adapted to align a flute in the center of a workpiece.
Figure 5B:
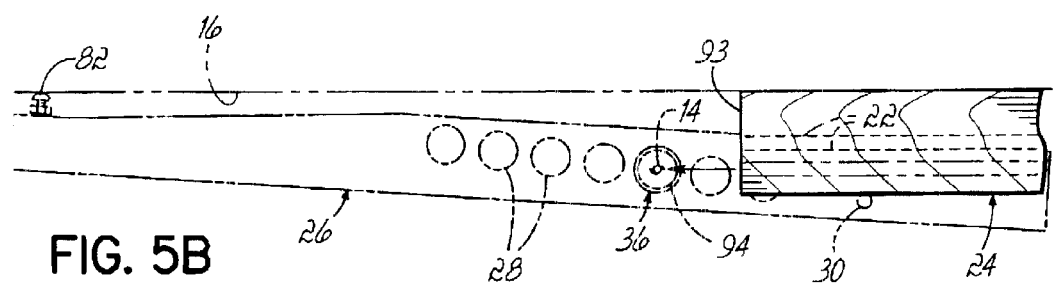
FIG. 5B is a top view of the flute-spacing jig shown in FIG. 5A, showing the alignment for the routing of a second flute in a workpiece.

To route the second flute 22 in the workpiece 24, as shown in FIG. 5B, the fifth spaced alignment hole 94 of the flute-spacing jig 26 is positioned over the router bit 14. When aligned, the jig 26 is removed and the first end 93 of the workpiece 24 is again moved along the fence 16 to route the second flute 22.

Figure 5C:
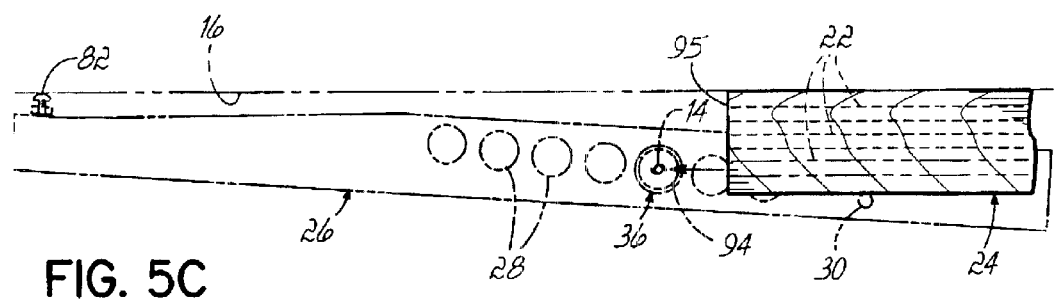
FIG. 5C is a top view of a flute-spacing jig shown in FIG. 5B, adapted to align the spacing of a third flute in a workpiece.
Figure 5D:
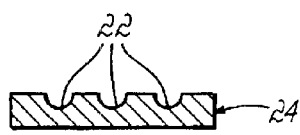
FIG. 5D is an end view of the workpiece shown in FIGS. 5A, 5B, and 5C, after three flutes have been routed in it.

FIG. 5C illustrates the routing of the third flute 22 (it will be on the opposite side of the second flute) in this workpiece 24, which is accomplished by simply reversing the end of the workpiece 24 so that the second end 95 will first pass over the router bit 14. In other words, to create the three flutes 22 in a workpiece 24 shown in FIG. 5D, the flute-spacing jig 26 only has to be used twice, since the alignment for the third routing is accomplished by simply reversing or turning the board 24 around and passing it over the routing bit 14 again.

As can be appreciated by those skilled in the art, and as further illustrated in FIGS. 6A, 6B, 6C, 7A, 7B, 7C, 8, 9, and 10, a variety of different combinations of flutes may be routed using the flute-spacing jig 26 of the present invention. However, it should also be appreciated that the number of flutes 22 one may route in a workpiece 24 may be limited by the width of the desired flute 22, as well as the width of the workpiece 24.

Figure 6A:
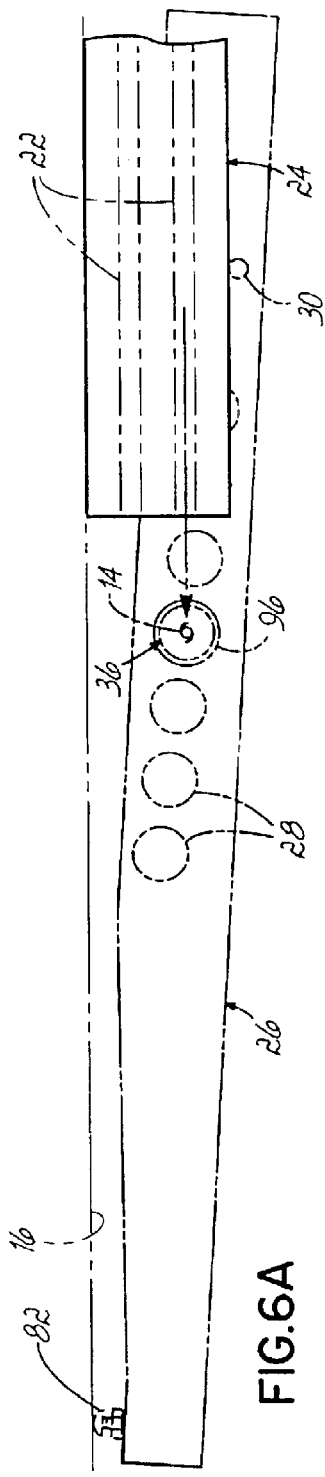
FIG. 6A is a top view of a flute-spacing jig shown in FIG. 1 aligned to route two flutes in a workpiece.
Figure 6B:
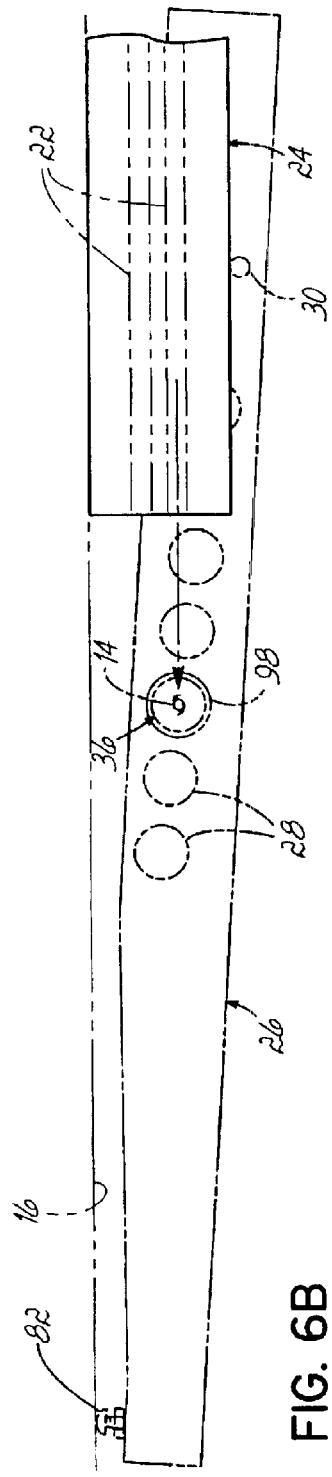
FIG. 6B is a top view of-the flute-spacing jig shown in FIG. 6A alternatively aligned to route two flutes in a workpiece.
Figure 6C:
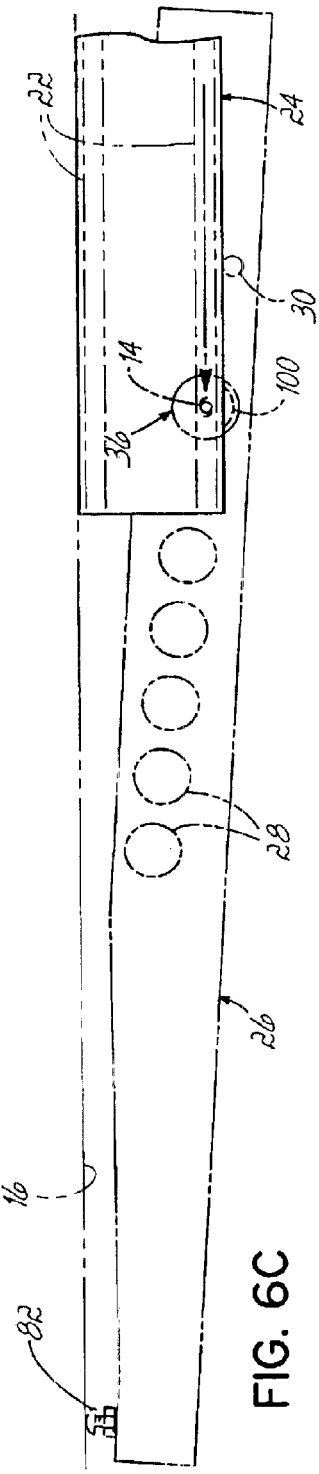
FIG. 6C is a top view of the flute-spacing jig shown in FIG. 6B alternatively aligned to route two flutes in a workpiece.

FIG. 6A illustrates the routing of two flutes 22 in a workpiece 24 where the fourth spaced alignment hole 96 is positioned over the router bit 14. Alternatively, FIG. 6B illustrates the routing of two flutes 22, where the third spaced alignment hole 98 is positioned over the router bit 14. Another method of routing two flutes is shown in FIG. 6C, where the seventh spaced alignment hole 100 is used to align the flute-spacing jig 26 over the routing bit 14. For each of these setups in FIGS. 6A–6C, the workpiece 24 is rotated 180° after the first pass over the router bit 14 and then sent through again to machine the second flute 22.

Figure 7A:
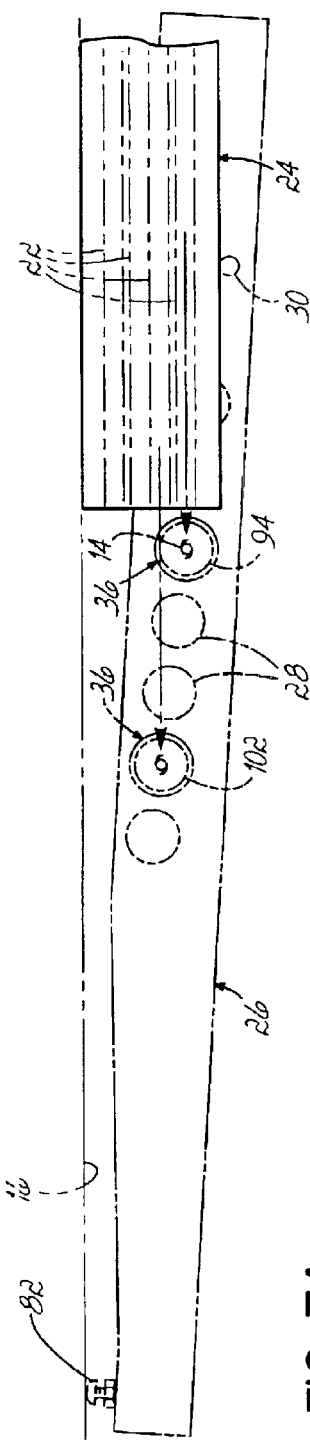
FIG. 7A is a top view of the flute-spacing jig shown in FIG. 1 aligned to route four flutes in a workpiece.
Figure 7B:
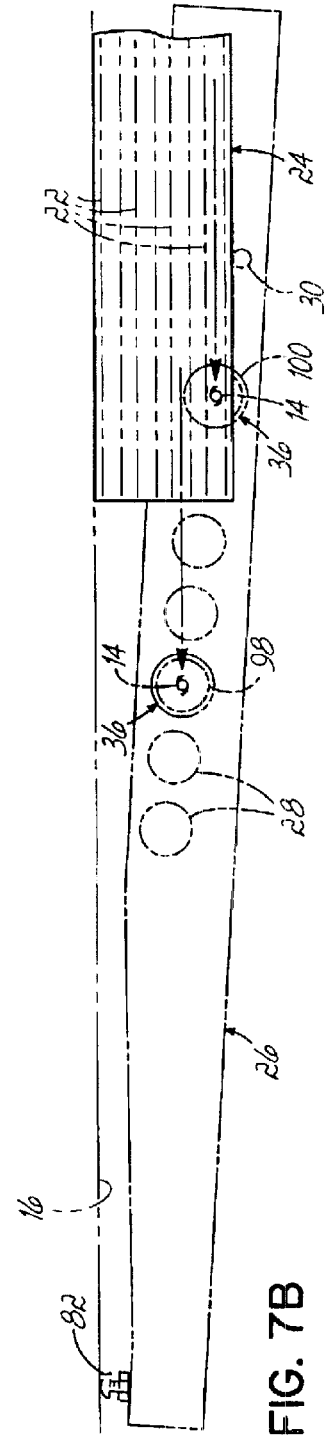
FIG. 7B is a top view of the flute-spacing jig shown in FIG. 7A alternatively aligned to route four flutes in a workpiece.
Figure 7C:
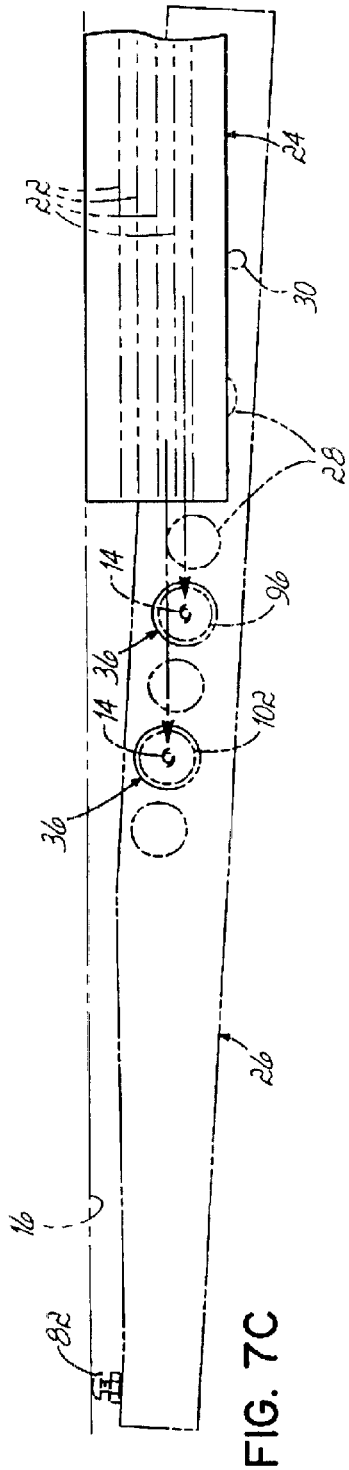
FIG. 7C is a top view of the flute-spacing jig shown in FIG. 7B alternatively aligned to route four flutes in a workpiece.

FIGS. 7A, 7B, and 7C illustrate various ways of routing four flutes 22 in a workpiece 24. All of these setups also require rotation of the workpiece 24 to produce the additional flutes 22. FIG. 7A illustrates the process utilizing the second 102 and fifth 94 spaced alignment holes 28, whereas FIG. 7B illustrates a procedure utilizing the third 98 and seventh 100 spaced alignment holes 28, and FIG. 7C illustrates the routing of four flutes 22 utilizing spaced alignment holes 28 number two 102 and number four 96. In each of these examples, the workpiece 24 passes twice over the router bit 14 for each alignment position. In other words, once the workpiece 24 is aligned, it is moved over the router bit 14 to route the first flute 22, and then the workpiece 24 is reversed and again slid over the router bit 14, whereby the second flute 22 is routed.

Figure 8:
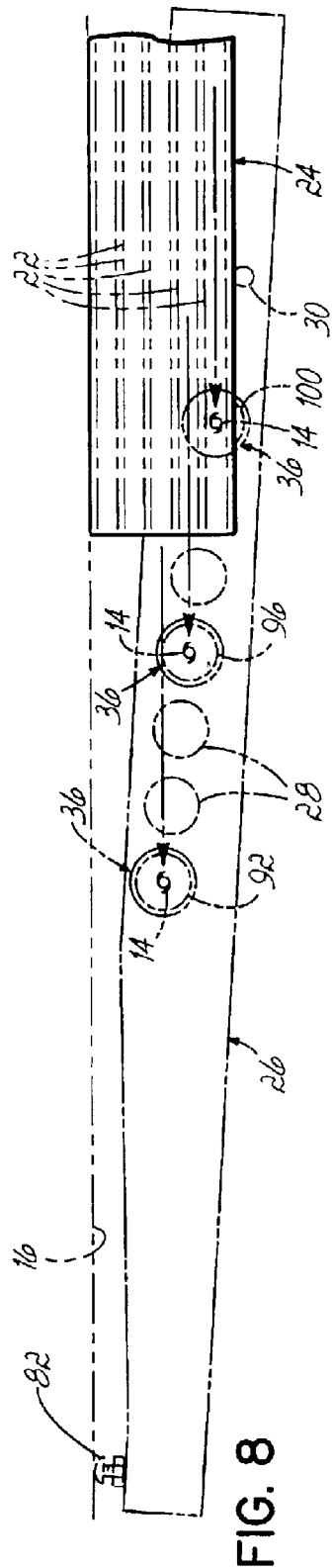
FIG. 8 is a top view of the flute-spacing jig shown in FIG. 1 aligned to route five flutes in a workpiece.

FIG. 8 illustrates the routing of five flutes 22 in a workpiece 24 utilizing the first 92, the fourth 96, and the seventh 100 spaced alignment holes 28. In this example, the workpiece 24 passes over the router bit 14 only once when aligned with the first 92 spaced alignment hole 28, but will be passed twice over the router bit 14 for each of the other two settings.

Figure 9:
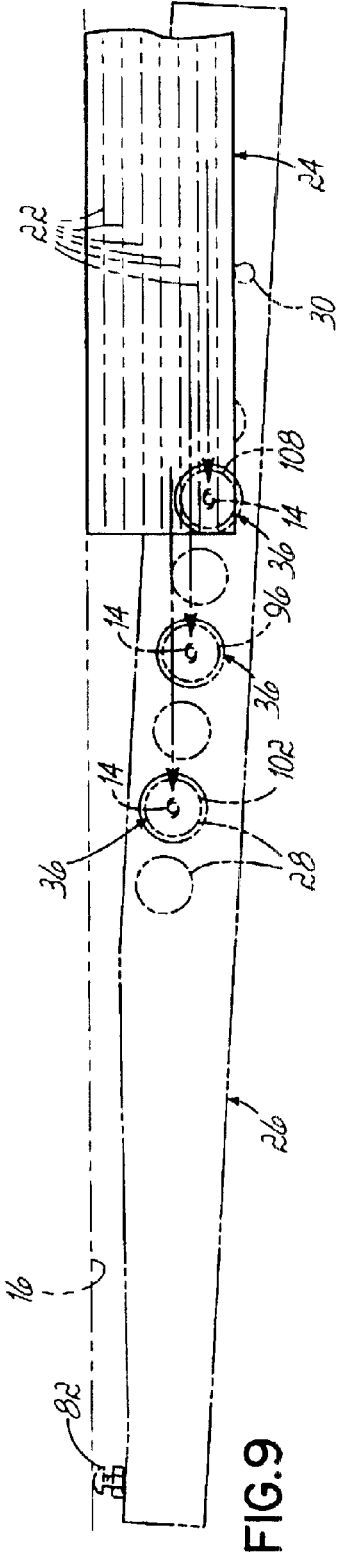
FIG. 9 is a top view of the flute-spacing jig shown in FIG. 1 aligned to route six flutes in a workpiece.

FIG. 9 illustrates the routing of six holes in a workpiece 24 utilizing the second 102, the fourth 96, and the sixth 108 spaced alignment holes 28. The workpiece 24 will pass twice over the router bit 14 for each of these settings.

Figure 10:
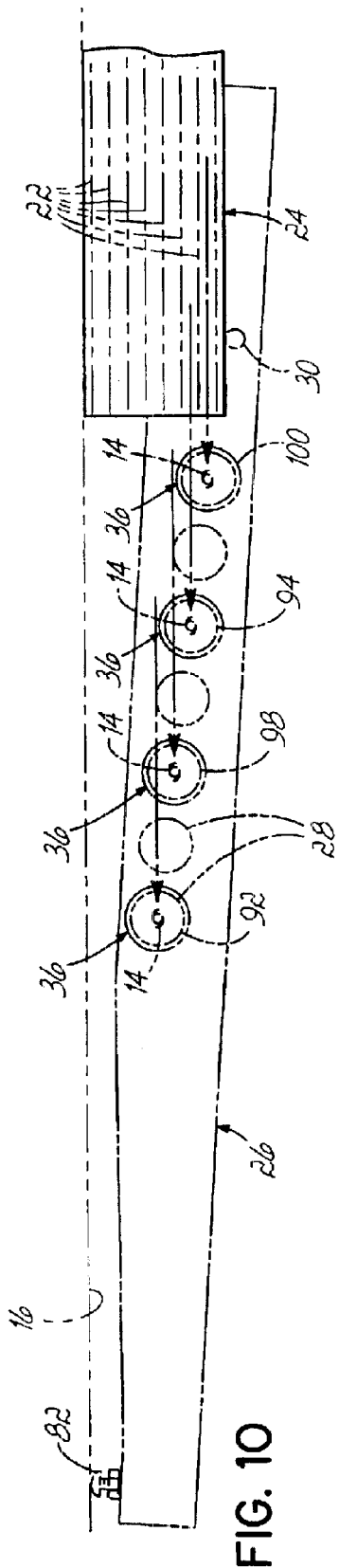
FIG. 10 is a top view of the flute-spacing jig shown in FIG. 1 aligned to route seven flutes in a workpiece.

Finally, FIG. 10 illustrates the routing of seven flutes 22 in a workpiece 24 utilizing the first 92, the third 98, the fifth 94, and the seventh 100 spaced alignment holes. In this case, the workpiece 24 will be passed over the router bit 14 twice for each of the settings, with the exception of the alignment set with the first 92 spaced, cylindrical alignment hole 28.

Figure 11:
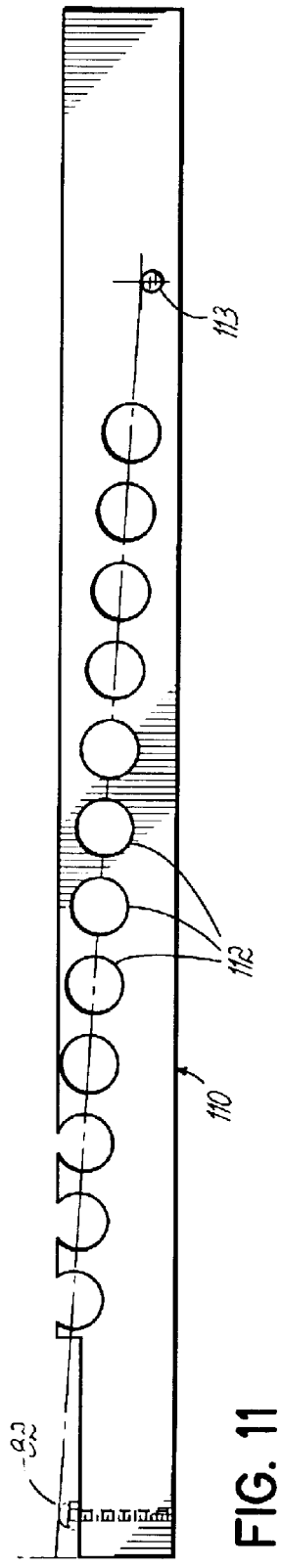
FIG. 11 is an alternative embodiment of the flute-spacing jig of the present invention.
Figure 12A:
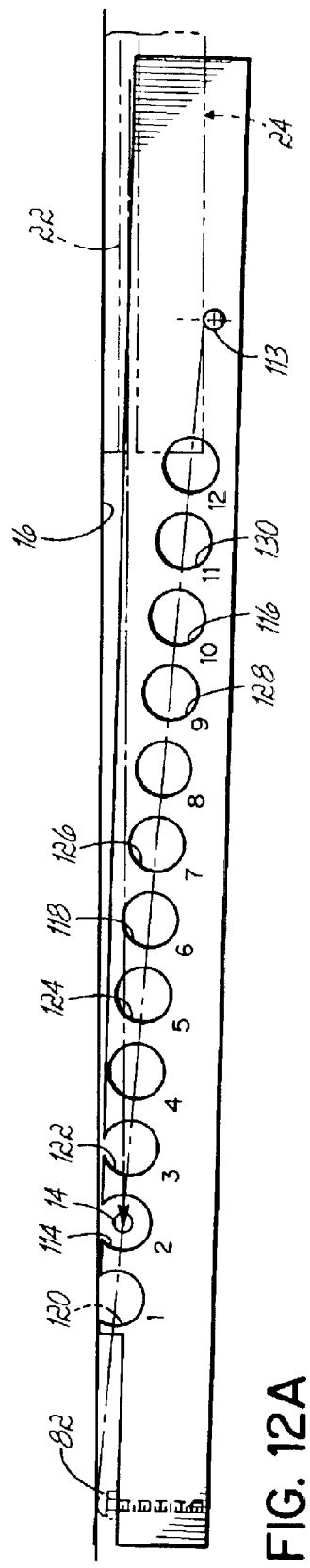
FIG. 12A is top view of the flute-spacing jig shown in FIG. 11 illustrating the placement of a router bit to route two flutes in a workpiece.
Figure 12B:
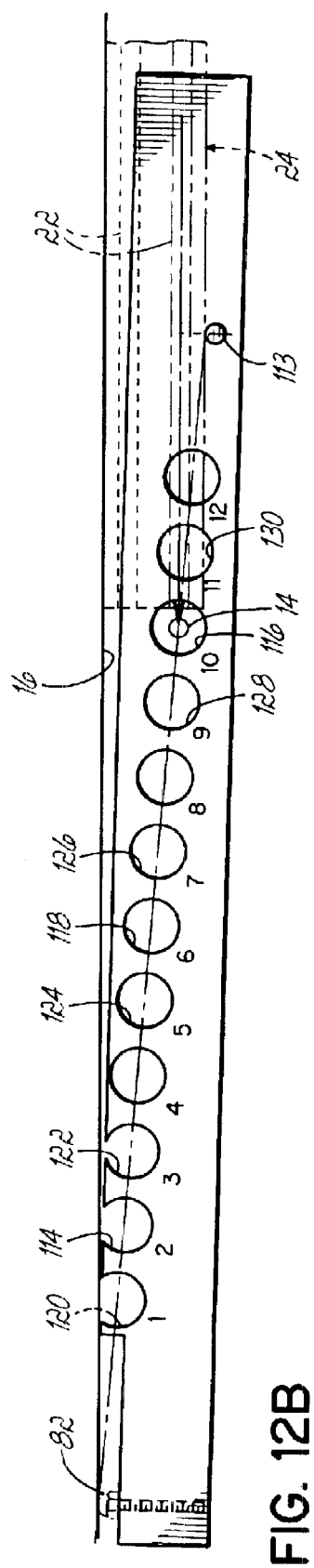
FIG. 12B is a top view of the flute-spacing jig shown in FIG. 12A showing the position of the router bit to route the second flute in a workpiece.

FIG. 11 illustrates an alternative embodiment of the flute-spacing jig 110 of the present invention. In this embodiment, twelve spaced alignment holes 112 are used to position the flute-spacing jig 110 over a router bit 14. An aligning pin 113, similar to pin 30 in the first embodiment, is used as well. For example, as shown in FIGS. 12A and 12B, if two flutes 22 were desired to be routed in a workpiece 24, the second spaced alignment hole 114 would be positioned over the router bit 14. To route the second flute 22, unlike the embodiment of the flute-spacing jig previously discussed, here the workpiece 24 does not need to be rotated, but rather the flute-spacing jig 110 is repositioned utilizing the tenth spaced alignment hole 116, and placing that hole 116 over the router bit 14. The workpiece 24 is then moved along the fence 16, and the second flute 22 is routed in the workpiece 24.

As before, various spaced, cylindrical alignment holes 112 are utilized to route a different number of flutes. For example, as illustrated, to route two flutes 22, the second 114 and tenth 116 holes are used. If three flutes 22 were desired, the second 114, sixth 118, and tenth 116 holes would be used. If six flutes 22 were desired, the first 120, third 122, fifth 124, seventh 126, ninth 128, and eleventh 130 spaced alignment holes 112 would be used.

The present invention may also be accomplished by a means known in the art for accomplishing the functions thereof. Thus, the present invention is not strictly limited to the disclosed components for carrying out the intended functions and objectives of the invention.

While the present invention has been illustrated by description of various embodiments and while these embodiments have been described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described. Accordingly, departures may be made from such details without departing from the spirit or scope of the applicant's general inventive concept.

What is claimed is:

1. An apparatus for aligning a workpiece for routing flutes therein comprising:
   a generally longitudinal jig with a first end and an opposing second end, a generally planar bottom surface and an opposing top surface, and a first side and a second side, wherein the width of the first end is less than the width of the first side and the width of the second end is less than the width of the second side;
   a fence guide attached to the first side of the generally longitudinal jig;
   an alignment hole in the generally planar bottom surface of the generally longitudinal jig, generally spaced between the first end and the opposing second end of the generally longitudinal jig; and
   a raised workpiece aligner, the raised workpiece aligner rising generally vertically from the top surface of the generally longitudinal jig.

2. The apparatus of claim 1 further comprising a plurality of spaced alignment holes in the generally planar bottom surface of the generally longitudinal jig.

3. The apparatus of claim 1 wherein the fence guide comprises:
   a screw; and
   a lock nut attached to the screw.

4. The apparatus of claim 1 wherein the alignment hole creates an aperture in the top surface of the generally longitudinal jig.

5. The apparatus of claim 1 wherein the raised workpiece aligner is spaced near the opposing second end of the generally longitudinal jig.

6. The apparatus of claim 1 wherein the generally longitudinal jig is metal.

7. The apparatus of claim 1 wherein the generally longitudinal jig is wood.

8. The apparatus of claim 1 wherein the generally longitudinal jig is plastic.

9. The apparatus of claim 1 wherein the generally longitudinal jig is fiber glass.

10. The apparatus of claim 1 wherein a portion of the first side has a taper toward the second side, the taper having a beginning and an ending, whereby the width of the generally planar bottom surface and the width of the opposing top surface at the ending of the taper is generally less than the width of the generally planar bottom surface and the width of the opposing top surface at the beginning of the taper.

11. The apparatus of claim 10 wherein the fence guide is generally spaced between the first end of the generally longitudinal jig and the ending of the taper.

12. The apparatus of claim 10 wherein the alignment hole in the generally planar bottom surface of the generally longitudinal jig is generally spaced between the beginning of the taper and the opposing second end of the generally longitudinal jig.

13. The apparatus of claim 10 wherein the alignment hole in the generally planar bottom surface of the generally longitudinal jig is generally spaced between the beginning of the taper and the raised workpiece aligner.

14. A system for spacing flutes comprising:
   a router table;
   a router, with an attached router bit, operably attached to the router table;
   a router fence slidably attached to the router table; and
   a flute-spacing jig having a first end and an opposing second end and a first side and a second side, wherein the width of the first end is less than the width of the first side and the width of the second end is less than the width of the second side, and wherein the flute-spacing jig has a plurality of alignment holes angularly spaced between the first side and the second side for positioning the flute-spacing jig over the router bit.

15. The system of claim 14 wherein the flute-spacing jig is metal.

16. The system of claim 14 wherein the flute-spacing jig is wood.

17. The system of claim 14 wherein the flute-spacing jig is plastic.

18. The system of claim 14 wherein the flute-spacing jig is fiber glass.

19. The system of claim 14 wherein the flute-spacing jig has a first longitudinally-spaced end portion and an opposing second longitudinally-spaced end portion wherein the first longitudinally-spaced end portion is tapered.

20. The system of claim 14 wherein the flute-spacing jig has a first longitudinally-spaced end portion and an opposing second longitudinally-spaced end portion wherein the first longitudinally-spaced end portion has an attached fence guide.

21. The system of claim 20 wherein the attached fence guide comprises:
a screw; and
a lock nut attached to the screw.

22. The system of claim 14 wherein the flute-spacing jig has a first longitudinally-spaced end portion and an opposing second longitudinally-spaced end portion with the opposing second longitudinally-spaced end portion having a workpiece aligner.

23. The system of claim 22 wherein the workpiece aligner is raised.

24. The system of claim 22 wherein the workpiece aligner is a pin.

25. The system of claim 14 further comprising a removable bushing temporarily centering the flute-spacing jig over the router bit.

26. The system of claim 25 wherein the removable bushing has an aperture, the aperture having an internal diameter sized to allow the removable bushing to be placed over the router bit, the removable bushing also having an exterior diameter, the exterior diameter being sized to allow the removable bushing to slidably mate with the internal diameter of the alignment holes of the flute-spacing jig.

27. The system of claim 26 wherein the removable bushing has a flange, the flange having an exterior diameter greater than the diameter of the alignment holes of the flute-spacing jig whereby the flange of the removable bushing is operably supported by the flute-spacing jig.

28. The system of claim 14 further comprising a T-square slidably contacting the router table.

29. The system of claim 28 further comprising a stop-block attached to the T-square.

30. The system of claim 29 wherein the stop-block is adjustable.

31. The system of claim 29 wherein the stop-block is removable.

32. The system of claim 29 wherein the stop-block is hinged.

33. The system of claim 14 wherein the router fence further comprising:
a longitudinal channel positioned in the router fence; and
a stop-block slidably attached to the longitudinal channel in the router fence.

34. The system of claim 33 wherein the stop-block is adjustable.

35. The system of claim 33 wherein the stop-block is removable.

36. The system of claim 33 wherein the stop-block is hinged.

37. A system for spacing flutes comprising:
a router table;
a router, with an attached router bit, operably attached to the router table;
a router fence slidably attached to the router table;
a flute-spacing jig with a plurality of spaced alignment holes between a first longitudinally-spaced end portion and an opposing second longitudinally-spaced end portion, wherein the first longitudinally-spaced end portion is tapered and has an attached fence guide, and wherein the opposing second longitudinally-spaced end portion has a raised workpiece aligner;
a removable bushing having an apertured body portion, the apertured body portion having an internal diameter sized to allow the removable bushing to be placed over the router bit, the removable bushing also having an exterior diameter, the exterior diameter being sized to allow the removable bushing to be placed within the spaced alignment holes of the flute-spacing jig whereby the spaced alignment holes of the flute-spacing jig are temporarily positioned over the router bit; and
a flange attached to the apertured body portion, the flange having an exterior diameter greater than the diameter of the spaced alignment holes of the flute-spacing jig whereby the flange is operably supported by the flute-spacing jig.

38. The system of claim 37 wherein the flute-spacing jig is metal.

39. The system of claim 37 wherein the flute-spacing jig is wood.

40. The system of claim 37 wherein the flute-spacing jig is plastic.

41. The system of claim 37 wherein the flute-spacing jig is fiber glass.

42. The system of claim 37 wherein the attached fence guide operably contacting the router fence comprises:
a screw; and
a lock nut attached to the screw.

43. The system of claim 37 wherein the raised workpiece aligner is a pin.

44. The system of claim 37 further comprising a T-square slidably attached to the router table, the T-square having an adjustable hinged stop-block.

45. A system for spacing flutes comprising:
a means for supporting a workpiece having a first end and a second end during routing operations;
a means for routing flutes in the workpiece operably attached to the means for supporting the workpiece during routing operations; and
a means for aligning the workpiece with the means for routing flutes in the workpiece, the means for aligning the workpiece having a first end and an opposing second end and a first side and a second side, wherein the width of the first end is less than the width at the first side and the width of the second end is less than the width of the second side, and wherein the means for aligning the workpiece has a plurality of alignment holes angularly spaced between the first side and the second side, whereby either the first end or the second end of the workpiece may be translated across the means for routing flutes.

46. A method for routing aligned flutes in a workpiece comprising:
aligning a workpiece with a flute-spacing jig, the jig having a first end and an opposing second end and a first side and a second side, wherein the width of the first end is less than the width of the first side and the width of the second end is less than the width of the second side, and wherein the jig has a plurality of alignment holes angularly spaced between the first side and the second side for positioning the jig over the router bit;
running a first end of the workpiece aligned with a router fence over a router bit;
reversing the workpiece; and
running a second end of the workpiece aligned with the router fence over the router bit.

47. A method for aligning a workpiece for routing flutes therein comprising:
positioning a spaced alignment hole of a flute-spacing jig over a router bit, the flute-spacing jig having a first end and an opposing second end and a first side and a second side, wherein the width of the first end is less than the width of the first side and the width of the second end is less than the width of the second side, and wherein the flute-spacing jig has a plurality of alignment holes angularly spaced between the first side and the second side for positioning the flute-spacing jig over the router bit;

placing a workpiece over the flute-spacing jig and between a raised aligner and a router fence;

sliding a router fence flush with the workpiece and the flute-spacing jig; and removing the flute-spacing jig.

48. The method of claim 47 further comprising putting a removable bushing through the spaced alignment hole and over the router bit.

49. The method of claim 47 further comprising positioning an adjustable hinged stop-block of a slidably T-square whereby a stop-flute may be routed in the workpiece.

50. A method for routing aligned flutes in a workpiece comprising:

positioning a spaced alignment hole of a flute-spacing jig over a router bit, the flute-spacing jig having a first end and an opposing second end and a first side and a second side, wherein the width of the first end is less than the width of the first side and the width of the second end is less than the width of the second side, and wherein the flute-spacing jig has a plurality of alignment holes angularly spaced between the first side and the second side for positioning the flute-spacing up over the router bit;

placing a workpiece over the flute-spacing jig and between a raised aligner and a router fence;

sliding the router fence flush with the workpiece and the flute-spacing jig;

removing the flute-spacing jig;

rotating the router bit; and running the workpiece aligned with the router fence over the router bit.

51. The method of claim 50 further comprising inserting a removable bushing through the angularly-spaced alignment hole and over the router bit.

52. The method of claim 50 further comprising:

positioning an adjustable, hinged stop-block of a slidably T-square whereby a stop-flute may be routed in the workpiece; and blocking a path of the workpiece.

53. An apparatus for aligning a workpiece for routing flutes therein comprising:

a generally longitudinal flute-spacing jig with a first end and an opposing second end, a generally planar bottom surface and an opposing top surface, and a first side and a second side, wherein the width of the first end is less than the width of the first side and the width of the second end is less than the width of the second side;

an alignment hole in the generally planar bottom surface of the generally longitudinal flute-spacing jig, generally spaced between the first end and the opposing second end of the generally longitudinal flute-spacing jig; and a raised workpiece aligner integral with the generally longitudinal flute-spacing jig, the raised workpiece aligner rising generally vertically from the top surface of the generally longitudinal flute-spacing jig.

54. The apparatus of claim 53 further comprising a plurality of spaced alignment holes in the generally planar bottom surface of the generally longitudinal flute-spacing jig.

55. The apparatus of claim 53 wherein the alignment hole creates an aperture in the top surface of the generally longitudinal flute-spacing jig.

56. The apparatus of claim 53 wherein the raised workpiece aligner is spaced near the opposing second end of the generally longitudinal flute-spacing jig.

57. The apparatus of claim 53 wherein the workpiece aligner is a pin.

58. The apparatus of claim 53 further comprising a fence guide attached to the first side of the generally longitudinal flute-spacing jig.

59. The apparatus of claim 58 wherein the fence guide comprises:

a screw; and a lock nut attached to the screw.

60. The apparatus of claim 53 wherein the width of the first end is less than the width of the first side and the width of the second end is less than the width of the second side.

61. The apparatus of claim 60 further comprising:

a removable bushing having an aperture, the aperture having an internal diameter sized to allow the removable bushing to be placed over a router bit, the removable bushing also having an exterior diameter, the exterior diameter being sized to allow the removable bushing to slidably mate with the internal diameter of the alignment hole of the flute-spacing jig.

62. The apparatus of claim 61 wherein the removable bushing has a flange, the flange having an exterior diameter greater than the diameter of the spaced alignment hole of the flute-spacing jig whereby the flange of the removable bushing is operably supported by the flute-spacing jig.

63. An apparatus for aligning a workpiece for routing flutes therein comprising:

a generally longitudinal flute-spacing jig with a first end and an opposing second end, a generally planar bottom surface and an opposing top surface, and a first side and a second side, wherein the first side is adapted to operably position the flute-spacing jig against a router table fence while the workpiece is being aligned;

a plurality of spaced alignment holes in the generally planar bottom surface of the generally longitudinal flute-spacing jig, generally spaced between the first end and the opposing second end of the generally longitudinal flute-spacing jig, wherein the alignment holes create an aperture in the top surface of the generally flute-spacing longitudinal jig; and a raised workpiece aligner integral with the generally longitudinal flute-spacing jig, the raised workpiece aligner rising generally vertically from the top surface of the generally longitudinal flute-spacing jig, the raised workpiece aligner being positioned near the opposing second end of the generally longitudinal flute-spacing jig.

64. The apparatus of claim 63 wherein the workpiece aligner is a pin.

65. A system for spacing flutes comprising:

a means for supporting a workpiece having a first end and a second end during routing operations;

a means for routing flutes in the workpiece operably attached to the means for supporting the workpiece during routing operations; and a means for aligning the workpiece with the means for routing flutes in the workpiece without the need to take measurements, the means for aligning the workpiece having a first end and an opposing second end and a first side and a second side, wherein the width of the first end is less than the width at the first side and the width of the second end is less than the width of the second side, and wherein the means for aligning the workpiece has a plurality of alignment holes angularly spaced between the first side and the second side, whereby either the first end or the second end of the workpiece may be translated across the means for routing flutes.

66. A system for spacing flutes comprising:

a router table;

a router, with an attached router bit, operably attached to the router table;

a router fence slidably attached to the router table;

a flute-spacing jig having a first end portion and an opposing second end portion and a first side and a second side, wherein the width of the first end portion is less than the width of the first side and the width of the second portion end is less than the width of the second side, and wherein the flute-spacing jig has a plurality of alignment holes angularly spaced between the first side and the second side and between the first end portion and the opposing second end portion, and wherein the opposing second end portion has a raised workpiece aligner;

a removable bushing having an apertured body portion, the apertured body portion having an internal diameter sized to allow the removable bushing to be placed over the router bit, the removable bushing also having an exterior diameter, the exterior diameter being sized to allow the removable bushing to be placed within the alignment holes of the flute-spacing jig whereby the alignment holes of the flute-spacing jig are temporarily positioned over the router bit; and a flange attached to the apertured body portion, the flange having an exterior diameter greater than the diameter of the alignment holes of the flute-spacing jig whereby the flange is operably supported by the flute-spacing jig.

67. The system of claim 66 wherein the raised workpiece aligner is a pin.

* * * * *